United States Patent [19]

Hosokawa et al.

[11] Patent Number: 5,338,182
[45] Date of Patent: Aug. 16, 1994

[54] PRESSURE MOLDING APPARATUS FOR MOLTEN RESIN

[75] Inventors: Toshihiro Hosokawa; Kiyoshi Nakahara; Ryuichi Ishitsubo; Toshiyuki Okuda, all of Osaka, Japan

[73] Assignee: Hosokawa Seisakusho Co., Ltd., Osaka, Japan

[21] Appl. No.: 858,421

[22] Filed: Mar. 24, 1992

Related U.S. Application Data

[63] Continuation of Ser. No. 536,869, Jun. 12, 1990, abandoned.

[30] Foreign Application Priority Data

Jun. 13, 1989 [JP] Japan ............................ 1-69155[U]
Jun. 13, 1989 [JP] Japan ............................ 1-69157[U]

[51] Int. Cl.$^5$ ............................................. B29C 45/23
[52] U.S. Cl. ........................................ 425/562; 425/564; 425/586
[58] Field of Search ............... 425/562, 563, 564, 577, 425/586, 146, 565

[56] References Cited

U.S. PATENT DOCUMENTS

| 2,972,776 | 2/1961 | Siegrist | 425/565 |
|---|---|---|---|
| 3,912,133 | 10/1975 | Hahl | 425/563 |
| 4,010,903 | 3/1977 | Sakuri et al. | 425/563 |
| 4,073,944 | 2/1978 | Dawson | 425/562 |
| 4,076,485 | 2/1978 | Sokolow | 425/563 |
| 4,082,226 | 4/1978 | Applaman et al. | 425/564 |
| 4,106,887 | 8/1978 | Yasuika et al. | 425/566 |
| 4,272,236 | 6/1981 | Rees et al. | 425/564 |
| 4,330,258 | 5/1982 | Gallert | 425/564 |
| 4,389,358 | 6/1983 | Handry | 425/562 |
| 4,443,178 | 4/1984 | Fujita | 425/564 |
| 4,810,184 | 3/1989 | Gellert et al. | 425/570 |
| 4,832,593 | 5/1989 | Brown | 425/564 |
| 4,834,294 | 5/1989 | Herzog | 425/564 |
| 4,919,606 | 4/1990 | Gellert | 425/564 |
| 5,080,570 | 1/1992 | Baxi et al. | 425/562 |

FOREIGN PATENT DOCUMENTS

| 55-132226 | 10/1980 | Japan. | |
|---|---|---|---|
| 268636 | 1/1968 | U.S.S.R. | 425/564 |
| 498653 | 1/1939 | United Kingdom | 425/564 |

Primary Examiner—Jay H. Woo
Assistant Examiner—Robert B. Davis
Attorney, Agent, or Firm—Armstrong, Westerman, Hattori, McCleland & Naughton

[57] ABSTRACT

This invention is directed to a pressure molding apparatus for molten resin in which an oil-pressurized cylinder internally holding an end of gate pin can freely move in compatibility with thermal elongation or contraction of a manifold pipe. In addition, a limit switch to be activated by the descending movement of this cylinder in correspondence with the descending movement of the gate pin is interlinked to a molten-resin supply source. By provision of these mechanisms, molten resin can smoothly be delivered to the interior of a molding unit without obstruction. Since substantial space is provided around this cylinder, pipes can easily be installed. Furthermore, the inner lateral surface of the gate aperture on the side of the gate pin is provided with an obtuse angle wider than the tip angle of the gate pin, and a tapered hole having an adequate length and tapered diameter expanding itself from the gate aperture to the inner surface of the molding unit is provided. By provision of the above structure, the gate aperture is prevented from being choked by residual resin and a concave indentation cannot be generated in the molded resin product at the portion corresponding to the gate aperture.

3 Claims, 7 Drawing Sheets

PRESSURE MOLDING APPARATUS FOR MOLTEN RESIN

This application is a continuation of application Ser. No. 536,869 filed Jun. 12, 1990 and now abandoned.

This invention is to provide a pressure molding apparatus for molten resin in which an oil-pressurized cylinder internally holding an end of gate pin can freely move in compatibility with thermal elongation or contraction or a manifold pipe, and in addition, a limit switch to be activated by descending movement of this cylinder in correspondence with the descending movement of the gate pin is interlinked to molten-resin supply source.

By provision of these mechanism, molten resin can smoothly be delivered to the interior of molding unit without obstruction.

Further, since substantial space is provided around this cylinder, pipes can easily be installed.

Furthermore, inner lateral surface of gate aperture on the side of the gate pin is provided with an obtuse angle wider than the tip angle of the gate pin, and yet, a tapered hole having an adequate length and tapered diameter expanding itself from the gate aperture to the inner surface of the molding unit is provided.

By provision of the above structure, the gate aperture cannot be choked by residual resin and concave cannot be generated in the molded resin product at the portion corresponding to the gate aperture.

FIELD OF THE INVENTION

The present invention relates to a pressure molding apparatus for molten resin.

The object of the invention is provide a pressure molding apparatus for molten resin incorporating a novel molten-resin supply mechanism capable of smoothly feeding molten resin to the interior of a molding unit without obstruction.

BACKGROUND OF THE INVENTION

Owing to economic advantages, the compatibility for freely shaping final products, and light weight, molded goods are widely used for a variety or industrial fields including manufacture of automobiles and electric appliances, for example, in an extremely large quantity.

As will be described later on, molded plastic goods are conventionally produced by applying an injection molding process.

However, in recent years, some of those skilled in the art have introduced a system for molding resin by applying such a pressure molding apparatus for molten resin provided with a molding unit composed of upper and lower molds (k) and (l) shown in FIG. 8A through D.

Conventional molten-resin pressing and molding apparatuses press and mold molten resin (o) after feeding it to the interior of the molding unit (m) from the gate aperture (n) of the lower mold (l) of the molding unit (m) composed of the upper and lower molds (k) and (l).

DESCRIPTION OF THE PRIOR ART

Conventionally, molten resin is pressed and molded by applying an injection molding process.

The Japanese Open Patent Publication No. 55-132226 of 1980 discloses a molten-resin supply mechanism.

As shown in FIG. 5, this conventional system has a gate pipe (b) connected to a manifold pipe (a), where a gate pin (c) is inserted in the gate pipe (b).

Gate aperture (e) provided at the predetermined position of the mold (d), and the gate aperture (e) is opened and closed by the vertical movement of the gate pin (c).

As shown in the enlarged view of FIG. 6, the gate aperture (e) is provided by way of directly facing the inner surface of the mold (d), where the inner peripheral surface (f) of the gate aperture (e) on the side of the gate pin (c) is formed by applying an angle identical to that of the tip surface (g) of the gate pin (c).

While no molten resin is supplied, the tip surface (g) of the gate pin (c) comes into contact with the inner peripheral surface of the gate aperture (e) on the side of the gate pin (c) to close the gate aperture (e).

Molten resin passing through the manifold pipe (a) and the gate pipe (b) is delivered to the interior of the mold (d) after the gate pin (c) is disengaged from the gate aperture (e).

Oil-pressurized cylinder (h) vertically moving the gate pin (c) is installed on the base (i) disposed beneath the manifold pipe (a), whereas pipes (j) and (j) feeding oil to this cylinder are installed inside of the base (i).

When the oil-pressurized cylinder (h) is activated, the gate pin (c) moves in the vertical direction to open and close the gate aperture (e).

PROBLEMS TO BE SOLVED BY THE INVENTION

Nevertheless, since the above structure secures the oil-pressurized cylinder (h) on the base (i), if the manifold pipe, (a) thermally elongates or contracts, the position relationship between the gate pin (c) and the gate pipe (b) deviates. As a result, the oil-pressurized cylinder (h) has an obstacle to vertically move the the gate pin (c).

Furthermore, if molten resin were supplied while the gate aperture (e) is closed by the gate pin (c), there is a potential fear of causing molten resin to leak out of the juncture of the molten-resin supply route.

Furthermore, since the tip surface (g) of the gate pin (c) comes into contact with the inner peripheral surface of the gate aperture (e) on the side of the gate pin (c), as shown in FIG. 7, a certain clearance is generated between the tip surface (g) of the gate pin (c) and the inner peripheral surface (f) of the gate aperture (e) on the side of the gate pin (c) due to the presence of residual resin adhered to the inner peripheral surface (f) of the gate aperture (e) on the side of the gate pin (c).

As a result, molten resin on the side of the gate pin (c) infiltrates into the mold (d) through the clearance.

Further, in some cases, molten resin solidified at the gate aperture (e) by the differential temperature between the gate portion closed to the mold (d) and the hole on the side of the gate pin (c).

Furthermore, since the gate aperture (e) directly faces the inner surface of the mold (d), due to a differential temperature between the tip surface (g) of the gate pin (c) facing the gate aperture (e) and the mold (d), more particularly, because of higher temperature of the mold (d) than that of the gate pin (c), molten resin in contact with the tip surface (g) of the gate pin (c) is cooled at first, and as a result, a concave indentation may be generated in the molded resin that came into contact with the tip surface (g) of the gate pin (c).

Furthermore, since those pipes (j) and (j) feeding oil to the oil-pressurized cylinder (h) are installed inside of the base (i), piping operation incurs much inconvenience to installation workers.

DESCRIPTION OF THE PREFERRED EMBODIMENTS

Figure 1:
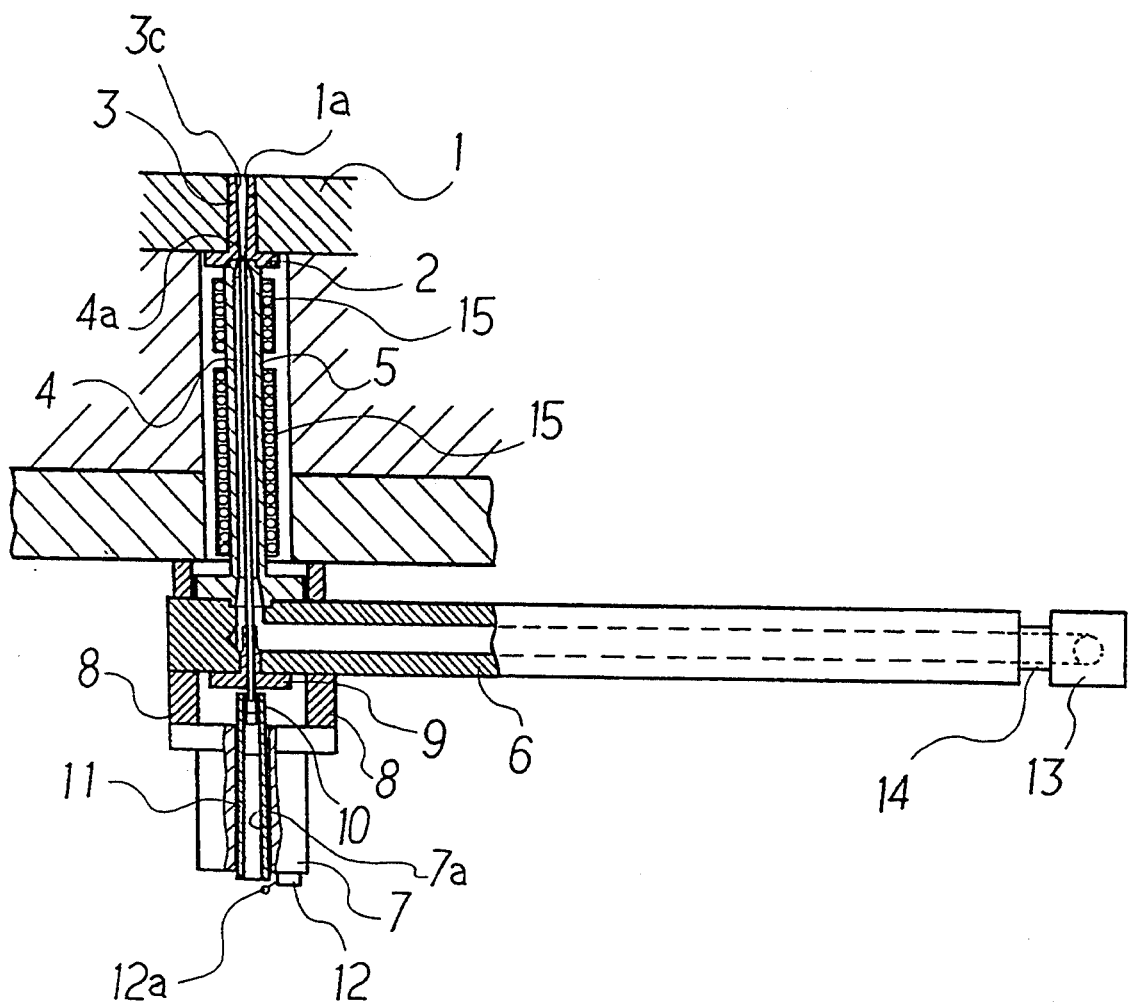
FIG. 1 illustrates the partially sectional front view of essential components of the pressure molding apparatus for molten resin embodied by the invention.

Referring now more particularly to FIG. 1 through 4, embodiments of the invention are described below.

The pressure molding apparatus for molten resin embodied by the invention is provided with a molding unit composed of a lower mold 1 and an upper mold (not shown).

Gate unit 2 is provided at the predetermined position of the lower mold 1.

Gate spool 3 is coupled to through-hole 1a which is provided at the predetermined position of the lower mold 1.

Gate aperture 3a is provided at the bottom end of the gate spool 3.

Figure 2:
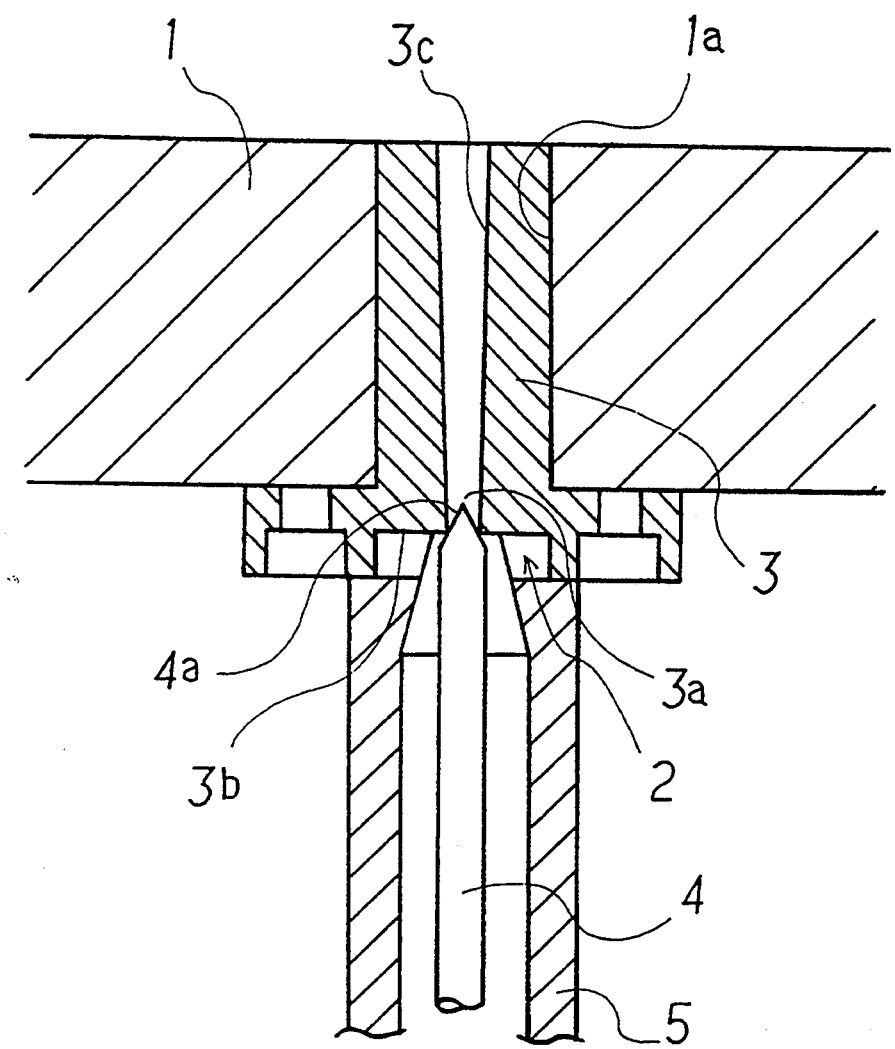
FIG. 2 illustrates the partially sectional view of the gate structure of the pressure molding apparatus for molten resin shown in FIG. 1.
Figure 3:
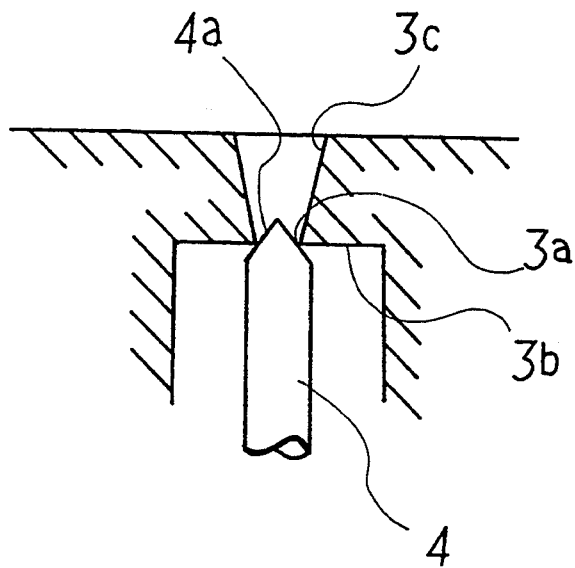
FIG. 3 illustrates the enlarged sectional view of essential components of the gate structure shown in FIG. 2.

As shown in FIGS. 2 and 3, the inner peripheral surface 3b of the gate spool 3 on the side of gate pin 4 is formed by applying an obtuse angle (180° according to this embodiment) which is wider than that of the tip surface 4a of the gate pin 4.

Tapered hole 3c having an adequate length and a tapered diameter expanding from the gate aperture 3a to the inner bottom surface of the lower mold 1 is provided.

The gate aperture 3a of the gate spool 3 opens and closes at the inclined tip surface 4a of the gate pin 4 which is inserted in the gate pipe 5 installed beneath the gate spool 3.

The bottom end of the gate pipe 5 is coupled to the upper tip of manifold pipe 6.

Oil-pressurized cylinder 7 vertically transferring the gate pin 4 is secured to the bottom surface at the tip end of the manifold pipe 6 across the fixing block 8.

The gate pin 4 is inserted in the axial center of the oil-pressurized cylinder 7 in order that the gate pin 4 can move upward and downward inside of the cylinder 7.

The reference numeral 9 shown in FIG. 1 designates a pin guide which guides to vertical movement of the gate pin 4 and is installed beneath the tip of the manifold pipe 6.

The reference numeral 10 shown in FIG. 1 designates pin joint which is connected to cylindrical body 11 installed inside of the through-hole 7a vertically penetrating axial center of the oil-pressurized cylinder 7.

Limit switch 12 which is provided with an operating arm 12a in opposition from the bottom end of the cylindrical body 11 connected to the bottom end of the gate pin 4 is provided beneath the oil-pressurized cylinder 7.

Substantial space is provided around the oil-pressurized cylinder 7, thus facilitating the work for connecting pipes to the oil-pressurized cylinder 7.

The limit switch 12 is activated when the gate pin 4 fully descends to fully open the gate aperture 3a.

When the limit switch 12 is turned ON, a molten-resin supply drive source (not shown) interlinked to the limit switch 12 is activated so that molten resin can be delivered to the interior of the molding unit.

The reference numeral 15 and 15 shown in FIG. 1 designate heaters which are disposed by way of surrounding the external periphery the gate pipe 5.

In order to feed molten resin to the interior of the molding unit using the molten-resin supply mechanism embodied by the invention, first, molten resin is delivered from a molten-resin supply pipeline base 13 to the manifold pipe 6 via a pillar pipe 14, and then molten resin is delivered from the manifold pipe 6 to the gate pipe 5.

Next, the gate pin 4 is moved downward by the activated oil-pressurized cylinder 7 so that the gate pin 4 can be disengaged from the gate aperture 3a.

As a result, the gate aperture 3a opens itself.

As soon as the gate pin 4 fully decends, the limit switch 12 of the cylindrical body 11 connected to the bottom end of the gate pin 4 is activated.

When the limit switch 12 is turned ON, molten-resin supply drive source (not shown) interlinked to the limit switch 12 is activated, and as a result, molten resin stored in the gate pipe 5 is delivered to the interior of the molding unit from the tapered hole 3c of the gate spool 3 via the gate aperture 3a.

Since the oil-pressurized cylinder 7 is secured to the manifold pipe 6 across the fixing block 8, even if the manifold pipe 6 thermally elongates or contracts while the molten-resin feeding operation is underway, the oil-pressurized cylinder 7 integrally moves together with the manifold pipe 6.

In consequence, the position of the gate pin 4 relative to the position of the gate pipe 5 cannot be displaced.

As a result, the gate pin 4 constantly and correctly moves in the vertical direction to allow the oil-pressurized cylinder 7 to also constantly and correctly operate itself.

When feeding molten resin from the gate aperture 3a to the interior of the molding unit, the tip surface 4a of the gate pin 4 inclines.

When the gate pin 4 fills the gate aperture 3a, the inner peripheral surface 3b of the gate aperture 3a on the side of the gate pin 4 is formed with an obtuse angle which is wider than that of the tip surface 4a of the gate pin 4.

By virtue of this arrangement, there is no fear of adversely affecting the state of contact due to the presence of solidified residual resin on the inner lateral surface of the gate aperture 3a of the side of the gate pin 4, and thus, the state of linear contact can constantly be maintained.

In consequence, the gate aperture 3a is constantly and perfectly filled by the tip surface 4a of the gate pin 4.

When the gate aperture 3a is fully filled by the tip surface 4a of the gate pin 4 by virtue of the mechanism mentioned above, molten resin is securely prevented from infiltrating into the molding unit.

Even if any amount of solidified residual resin adheres to the gate aperture 3a, since the tip of the gate pin 4 pushes residual resin upward to eliminate it when the gate pin 4 ascends itself, the gate aperture cannot be choked.

After completing the pressure molding of molten resin, a projected portion of the molded piece corresponding to the tapered hole 3c retains at the portion corresponding to the gate aperture 3a.

However, after completing the molding operation, the projected portion can be cut off by applying any available cutting means.

Figure 4:
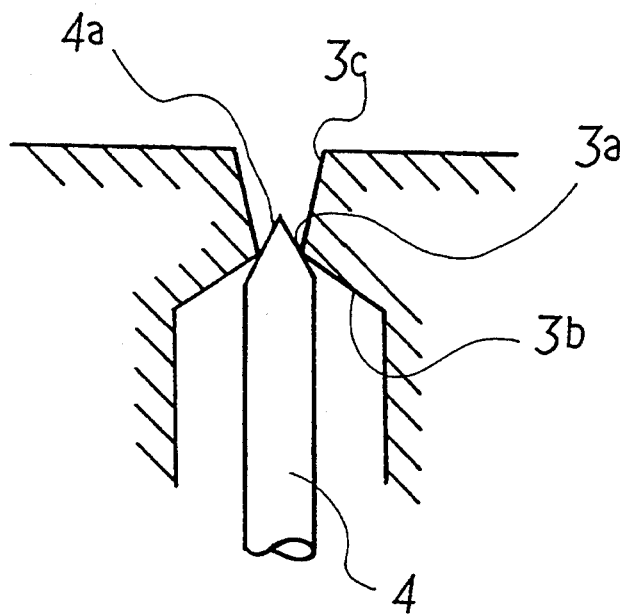
FIG. 4 illustrates the enlarged sectional view of another embodiment of the gate structure.
Figure 5:
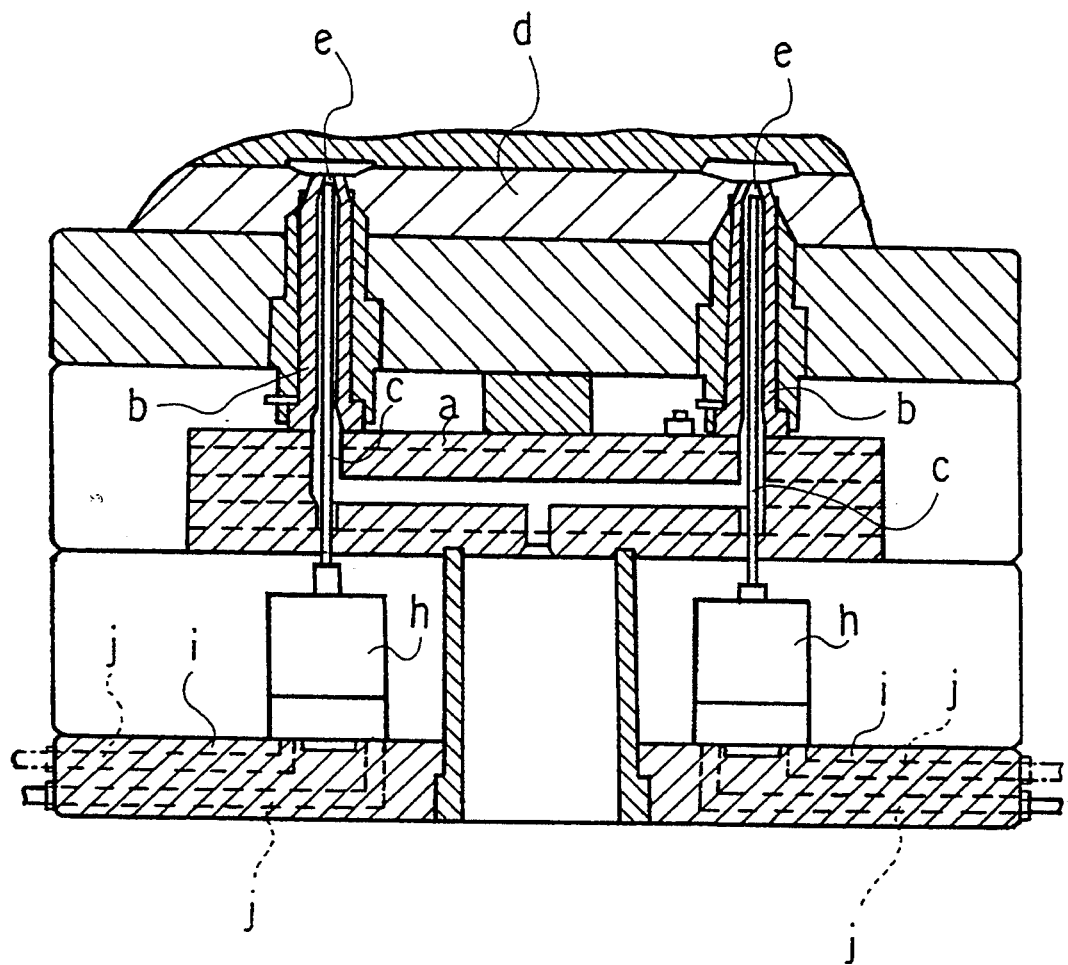
FIG. 5 illustrates the sectional view of a conventional pressure molding apparatus for molten resin.
Figure 6:
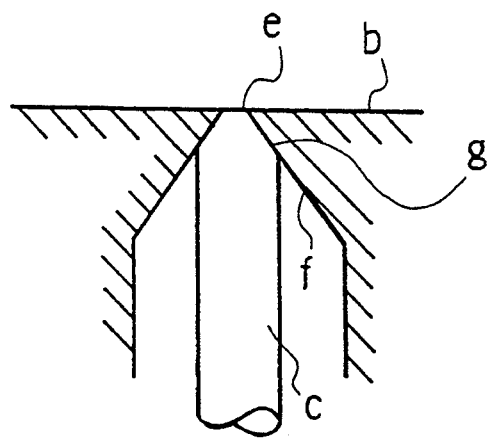
FIG. 6 illustrates the enlarged sectional view of the gate structure of the conventional apparatus shown in FIG. 5.
Figure 7:
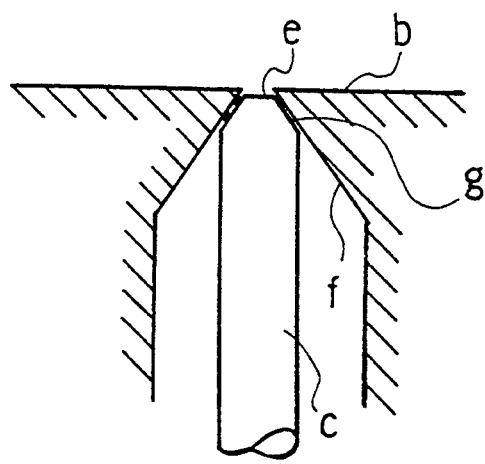
FIG. 7 illustrates the enlarged sectional view of the condition in which solidified residual resin adheres to the gate apparatus.
Figure 8A:
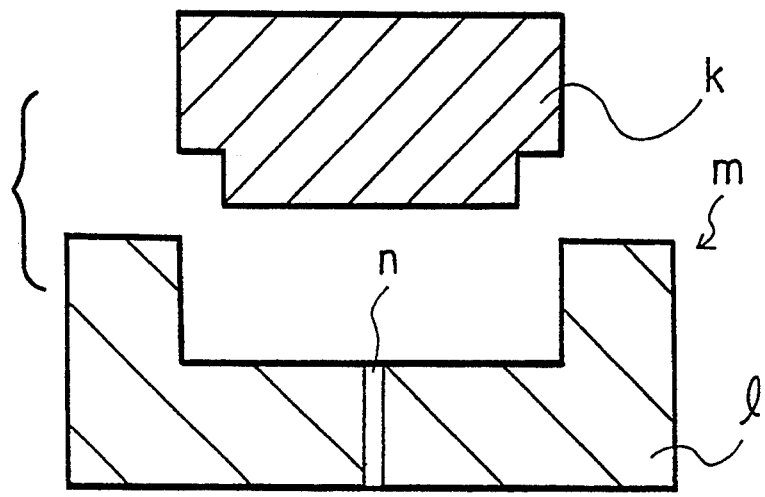
FIG. 8A through 8D illustrates the sectional view of the vertically pressing mold.
Figure 8B:
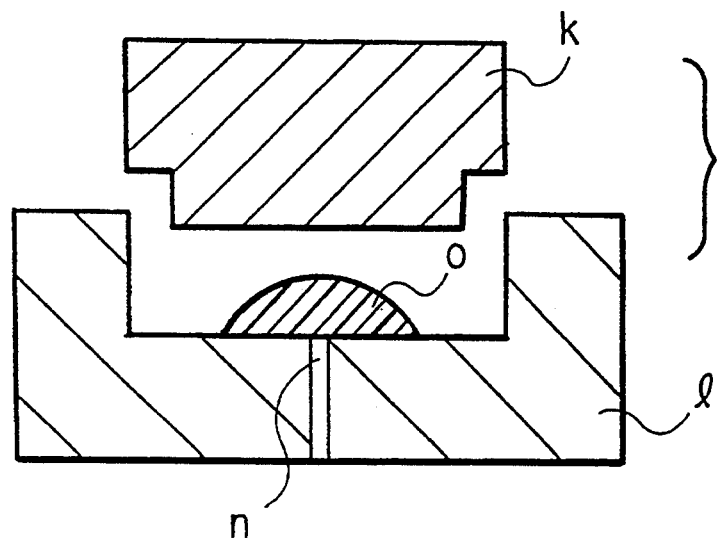
Figure 8C:
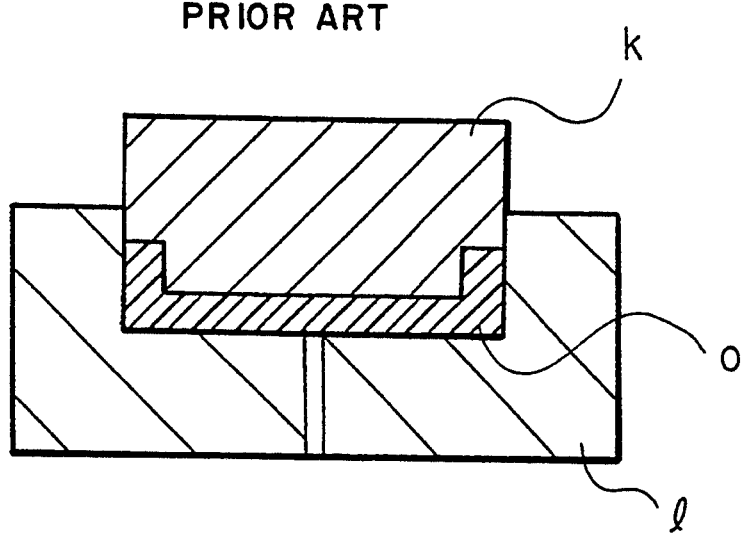
Figure 8D:
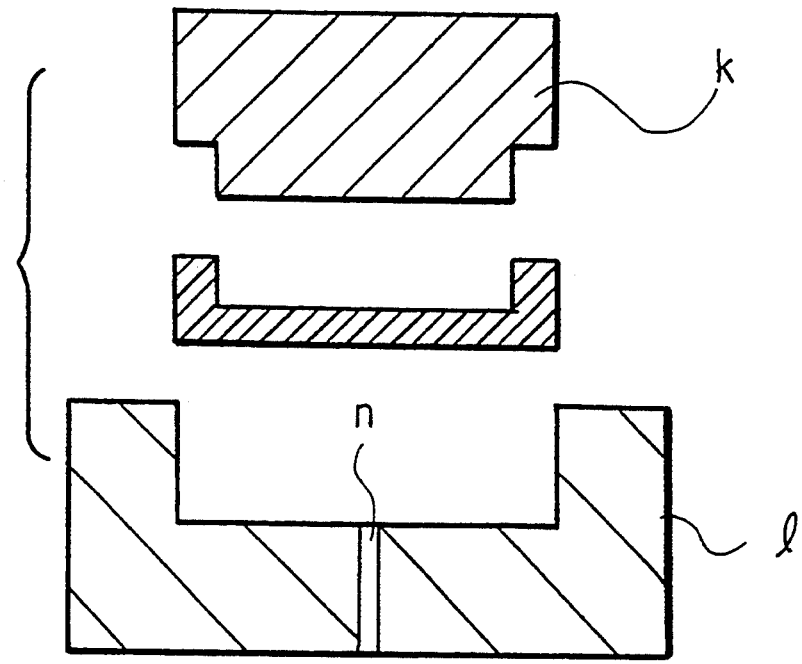

FIG. 4 illustrates another embodiment of the gate structure which is provided with less than 180° of the angle of the inner lateral surface 3b or the gate aperture 3a on the side of the gate pin 4.

The gate structure of this embodiment also achieves satisfactory effect identical to that of the above embodiment.

According to the invention, since the oil-pressurized cylinder is secured to the bottom surface at the tip end of the manifold pipe, even if the manifold pipe thermally elongates or contracts, the oil-pressurized cylinder integrally moves together with the manifold pipe.

As a result, there is no deviation of the position of the gate pin relative to the position of the gate pipe, and thus, the gate pin constantly and correctly roves in the vertical direction.

This in turn allows the oil-pressurized cylinder to also constantly and correctly operate itself.

The gate pin is disposed so that it can be driven in the vertical direction through the axial center of the oil-pressurized cylinder.

The limit switch interlinked to the molten-resin supply drive source is installed to the bottom end of the oil-pressurized cylinder, where the limit switch is activated by the descending movement of the gate pin.

Owing to this mechanism, when the gate pin fully descends and fully opens the gate aperture, the molten-resin supply drive source interlinked to the limit switch is activated so that molten resin can be fed to the interior of the molding unit.

This allows the supply of molten resin to be implemented effectively.

And yet, there is no fear of causing molten resin to leak out of the juncture of the supply route.

Furthermore, since the oil-pressurized cylinder is secured to the bottom surface at the tip end of the manifold pipe, and yet, since substantial space is provided around the oil-pressurized cylinder, operation for connecting pipes to the oil-pressurized cylinder can easily be performed.

Regarding the gate structure of the pressure molding apparatus for molten resin embodied by the invention, when the gate pin ascends to fill the gate aperture, the inner lateral surface of the gate aperture on the side of the gate pin is formed with an obtuse angle wider than that of the tip surface of the gate pin, and thus, the gate aperture linearly remains in contact with the tip surface of the gate pin.

This prevents occurrence of poor contact between the gate aperture and the tip surface of the gate pin due to the presence of solidified residual resin on the inner lateral surface of the gate aperture on the side of the gate pin, arid as a result, a linear contact condition can constantly be maintained.

Accordingly, when the gate aperture is constantly and fully filled by the tip surface of the gate pin, molten resin is securely prevented from infiltrating into the molding unit.

Furthermore, even if any amount of solidified residual resin adheres to the gate aperture, since the tip of the gate pin pushes the residual resin upward when the gate pin ascends itself, there is no fear of choking the gate aperture.

Furthermore, although the projected portion corresponding to the tapered portion of the gate aperture remains on the molded piece, this portion can be eliminated by applying any available cutting means.

As a result, unlike the conventional molding system, no concave portion can be generated on the portion corresponding to the gate aperture, and thus, the molded piece can perfectly formed flush with all the peripheral portions.

By virtue of the novel structure mentioned above, the pressure molding apparatus For molten resin embodied by the invention smoothly presses and molds molten resin without incurring obstruction at all.

What is claimed is:

1. A pressure molding apparatus for introducing molten resin into a molding unit that has an upper mold and a lower mold for pressing and molding the molten resin comprising:
    a manifold pipe;
    a gate pipe having a tapered end hole connected to said manifold pipe at an end opposite said tapered end hole and located under the molding unit;
    a gate spool coupled to a through hole in the molding unit, said gate spool having a gate spool aperture and a tapered hole having a tapered diameter connected to the gate aperture, the tapered hole being formed narrow at a gate aperture end and wide at a mold cavity end so as to prevent the gate aperture from being blocked by resin, and
    a gate pin inserted in said gate pipe to close the gate aperture by contact of the gate pin with the gate aperture.

2. A pressure molding apparatus for introducing molten resin into a molding unit that has an upper mold and a lower mold for pressing and molding the molten resin, comprising:
    a manifold pipe;
    a gate pipe having a tapered end hole connected to said manifold pipe at an end opposite said tapered end hole and located under the molding unit;
    a gate pin inserted in said gate pipe to close a gate aperture in a gate spool of the molding unit by means of said gate pin engaging the gate aperture, whereby disengaging said gate pin from the gate aperture, molten resin passing through said manifold pipe and said gate pipe is delivered to an interior of the molding unit; and
    an oil-pressurized cylinder for moving said gate pin in a vertical direction, the cylinder secured to a bottom surface at a tip end of said manifold pipe, wherein
    said gate spool having the gate aperture therein being coupled to a through hole in the molding unit, an inner lateral surface of the gate aperture on a side facing said gate pin being formed with an obtuse angle wider than a tip angle of said gate pin, said gate spool further having a tapered hole formed therein, the tapered hole between the gate aperture and the molding unit and having a predetermined length being defined as having a tapered diameter expanding from said gate aperture to the inner surface of the molding unit, the tapered hole being formed narrow at a gate pin end and wide at a mold cavity end so as to prevent the gate aperture from being blocked by resin.

3. The pressure molding apparatus for molten resin as set forth in claim 2, further comprising:
   a limit switch for activating in response to descending movement of said gate pin; and
   a molten resin supply drive source disposed at a bottom end of said oil pressurized cylinder, said gate pin located so as to penetrate an axial center of said oil-pressurized cylinder in the vertical direction such that said gate pin can be driven in the vertical direction.

* * * * *